(12) United States Patent
Salowey et al.

(10) Patent No.: US 8,700,907 B2
(45) Date of Patent: Apr. 15, 2014

(54) USE OF MOBILE COMMUNICATION NETWORK CREDENTIALS TO PROTECT THE TRANSFER OF POSTURE DATA

(75) Inventors: Joseph Salowey, Seattle, WA (US); Parviz Yegani, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 1272 days.

(21) Appl. No.: 11/759,116

(22) Filed: Jun. 6, 2007

(65) Prior Publication Data

US 2008/0307234 A1     Dec. 11, 2008

(51) Int. Cl.
*H04L 29/06*          (2006.01)
(52) U.S. Cl.
USPC .......................................... 713/182; 713/189
(58) Field of Classification Search
USPC .................................................. 713/189, 182
See application file for complete search history.

(56) References Cited

U.S. PATENT DOCUMENTS

| | | | |
|---|---|---|---|
| 6,785,816 B1 * | 8/2004 | Kivimaki et al. ............. | 713/181 |
| 7,418,253 B2 * | 8/2008 | Kavanagh ..................... | 455/410 |
| 2005/0203912 A1 * | 9/2005 | Beach et al. .................... | 707/10 |
| 2005/0238005 A1 * | 10/2005 | Chen et al. .................... | 370/389 |
| 2006/0015724 A1 * | 1/2006 | Naftali et al. ................. | 713/168 |
| 2008/0070544 A1 * | 3/2008 | Lior ........................... | 455/404.1 |
| 2008/0205392 A1 * | 8/2008 | Danzeisen et al. ............ | 370/389 |

OTHER PUBLICATIONS

Haverinen et al., Cellular Access Control and Charging for Mobile Operator Wireless Local Area Networks, Dec. 2002, IEEE, pp. 52-60.*
Haverinen & Salowey, "Extensible Authentication Protocol Method for Global System for Mobile Communications (GSM) Subscriber Identity Modules (EAP-SIM)", Network Working Group, Request for Comments: 4186, Jan. 2006, 65 pages.
Arkko & Haverinen, "Extensible Authentication Protocol Method for 3rd Generation Authentication and Key Agreement (EAP-AKA)", Network Working Group, Request for Comments: 4187, Jan. 2006, 74 pages.

* cited by examiner

*Primary Examiner* — Hadi Armouche
*Assistant Examiner* — Dao Ho
(74) *Attorney, Agent, or Firm* — Patent Capital Group

(57) ABSTRACT

In one embodiment, a method for using credentials for a mobile node to protect the transfer of posture data is provided. A network access device receives a message from a mobile node for access to a network. The message includes posture data encrypted using credentials for the mobile node. The credentials may be found in a storage card that is used to identify the mobile node. The network access device determines decryption information for the mobile node. For example, the credentials for the mobile node may be stored in a home location register (HLR) and are retrieved. The posture data is then decrypted using the credentials. The posture data is processed in a network admission control procedure for allowing access to the network. For example, a policy for access to the network may be installed based on the posture data.

16 Claims, 4 Drawing Sheets

US 8,700,907 B2

USE OF MOBILE COMMUNICATION NETWORK CREDENTIALS TO PROTECT THE TRANSFER OF POSTURE DATA

TECHNICAL FIELD

Particular embodiments generally relate to wireless networks.

BACKGROUND

Posture data may be information about the configuration of a device. For example, posture data is used in network admission control to check the posture of a device for access to a network. The posture data is sensitive information that should be encrypted and authenticated to avoid having an unauthorized party intercept the posture data and be able to access it. Accordingly, networks use private and public keys to encrypt and decrypt the posture data. In wired networks, the infrastructure to handle public key/private key encryption has been built and is easily used.

Previously, cellular networks did not see the need to use posture data in allowing access to a mobile node to the network. However, with the advent of third generation (3G) and fourth generation (4G) networks, it has become more useful to use posture data when performing network admission control. However, cellular networks do not have a public key/private key infrastructure in place. Thus, it would be very costly to build the public key/private key infrastructure to generate the information needed to encrypt/decrypt posture data in a network admission control procedure.

DESCRIPTION OF EXAMPLE EMBODIMENTS

Overview

In one embodiment, a method for using credentials for a mobile node to protect the transfer of posture data is provided. A network access device receives a message from a mobile node for access to a network. The message includes posture data encrypted and authenticated using credentials for the mobile node. The credentials may be found in a storage card that is used to identify the mobile node. The network access device determines decryption information for the mobile node. For example, the decryption information for the mobile node may be generated from a credential stored in a home location register (HLR). The posture data is then decrypted and authenticated using the credentials. The posture data is processed in a network admission control procedure for allowing access to the network. For example, a policy for access to the network may be installed based on the posture data.

Example Embodiments

Figure 1:
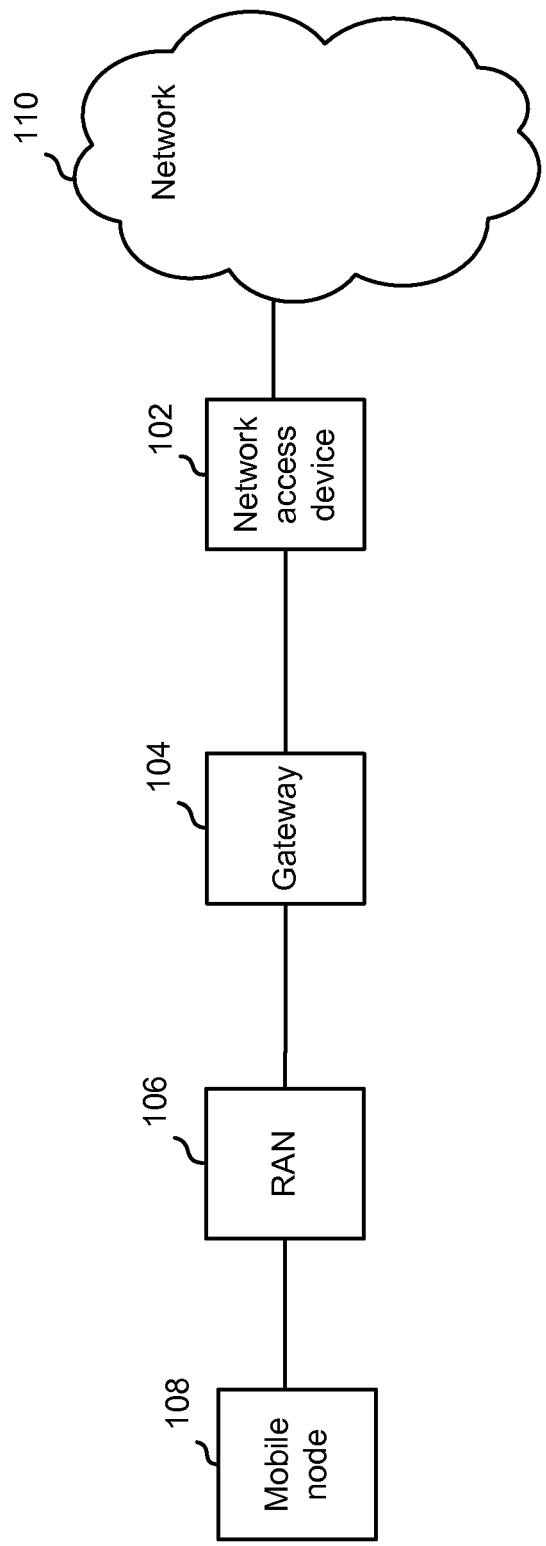
FIG. 1 depicts an example of a system for protecting posture data.

FIG. 1 depicts an example of a system for protecting posture data. As shown, a network access device 102, a gateway 104, a radio access network 106, and a mobile node 108 are provided. It will be understood that other devices may be included in the system.

In one embodiment, radio access network 106 includes a wireless mobile communications network and/or cellular network. For example, the cellular network may be a 3G or 4G network, but may be other generations of cellular networks. Also, radio access network 106 may include other wireless networks, such as a wireless fidelity (WiFi), wireless wide area networks such as CDMA2000, UMTS, etc.

Mobile node 108 may be any mobile entity, such as a cellular phone, laptop computer, personal digital assistant (PDA) smart phone, instant messaging client, etc. Mobile node 108 is configured to attach to radio access network 106. For example, mobile node 108 may attach to a base transceiver station in radio access network 106.

Gateway 104 may be a device that sits in between networks. For example, gateway 104 may sit in between a cellular network and another network 110, such as a wide area network (WAN), the Internet, or other data networks.

Network access device 102 provides network admission control to a network 110. The admission to a network may be any suitable network that device 102 is attempting to access, such as a home network, the Internet, a cellular network, etc. Network access device 102 is configured to authenticate mobile node 108. After authentication, mobile node 108 is allowed network access.

A network admission control procedure may be followed to allow mobile node 108 access to network 110. In the procedure, posture data may be provided from mobile node 108 to network access device 102. The posture data may be any information that may be used in the network admission control procedure. For example, the posture data may include aspects of configuration, software that runs on the device, patch levels for mobile node 108, anti-virus information, or other pieces of information about mobile node 108. The posture data is sensitive information that should be protected when being sent from mobile node 108 to network access device 102. Thus, the posture data should be protected using a secure mechanism. Conventionally, a private key/public key infrastructure may be used to generate the information to encrypt/decrypt the posture data. However, a public key/private key infrastructure may not be present in a cellular network. Accordingly, particular embodiments use credentials for mobile node 108 to encrypt/decrypt the posture data. Although credentials are used in plural in the document, it will be understood that credentials may mean a single credential or multiple credentials.

In one embodiment, the credentials may be stored in an object in mobile node 108. The credentials may be used to establish the identity of a party to communication. In one embodiment, they take the form of machine-readable cryptographic keys and/or passwords. The object may be a storage card or other storage device, such as read only memory, flash memory, etc. In one embodiment, the credentials are included in a subscriber identity module (SIM) or universal subscriber identity module (USIM). A SIM is a removable smart card that securely stores a key identifying a subscriber for mobile node 108. A SIM card may be used in a global system mobile (GSM) access network. A USIM may be used in a universal mobile telecommunication system (UMTS), which is a third generation ( 3G) mobile phone technology. Also, other credentials may be stored in the universal integrated circuit card (UICC) or a removable user identity module (RUIM). The storage card includes an international mobile subscriber identity (IMSI) that identifies a user's subscription a mobile node 108 will use to access services provided by the mobile service provider. The mobile device itself, however, may be identified by a hardware ID such as ESN, mobile equipment ID (MEID), etc.

The credentials may be used to authenticate mobile node 108 to a cellular network. For example, a secret key, $k_i$, may be stored in the storage card and is conventionally used to authenticate mobile node 108 to radio access network 106. For example, when mobile node 108 attaches to radio access network 106, the credentials are used to authenticate mobile node 108 to access the network. However, particular embodiments use the credentials to encrypt the posture data. In one example, the credentials are any authentication material in the storage card that can be used to encrypt posture data. The credentials may be used to create authentication vectors containing cryptographic keys that are used to encrypt and authenticate the posture data. Network access device 102 also has access to the credentials on the network side. For example, the credentials may be stored in a home location register (HLR), a AAA server or other device, such as a home subscriber server (HSS). The credentials are then used to reproduce the authentication vectors, which are used to decrypt the posture data. Accordingly, credentials that are already used by mobile node 108 to gain access to radio access network 106 are used to encrypt/decrypt the posture data. This provides a symmetric encryption process that alleviates the need for a public key/private key infrastructure in the cellular network.

Figure 2:
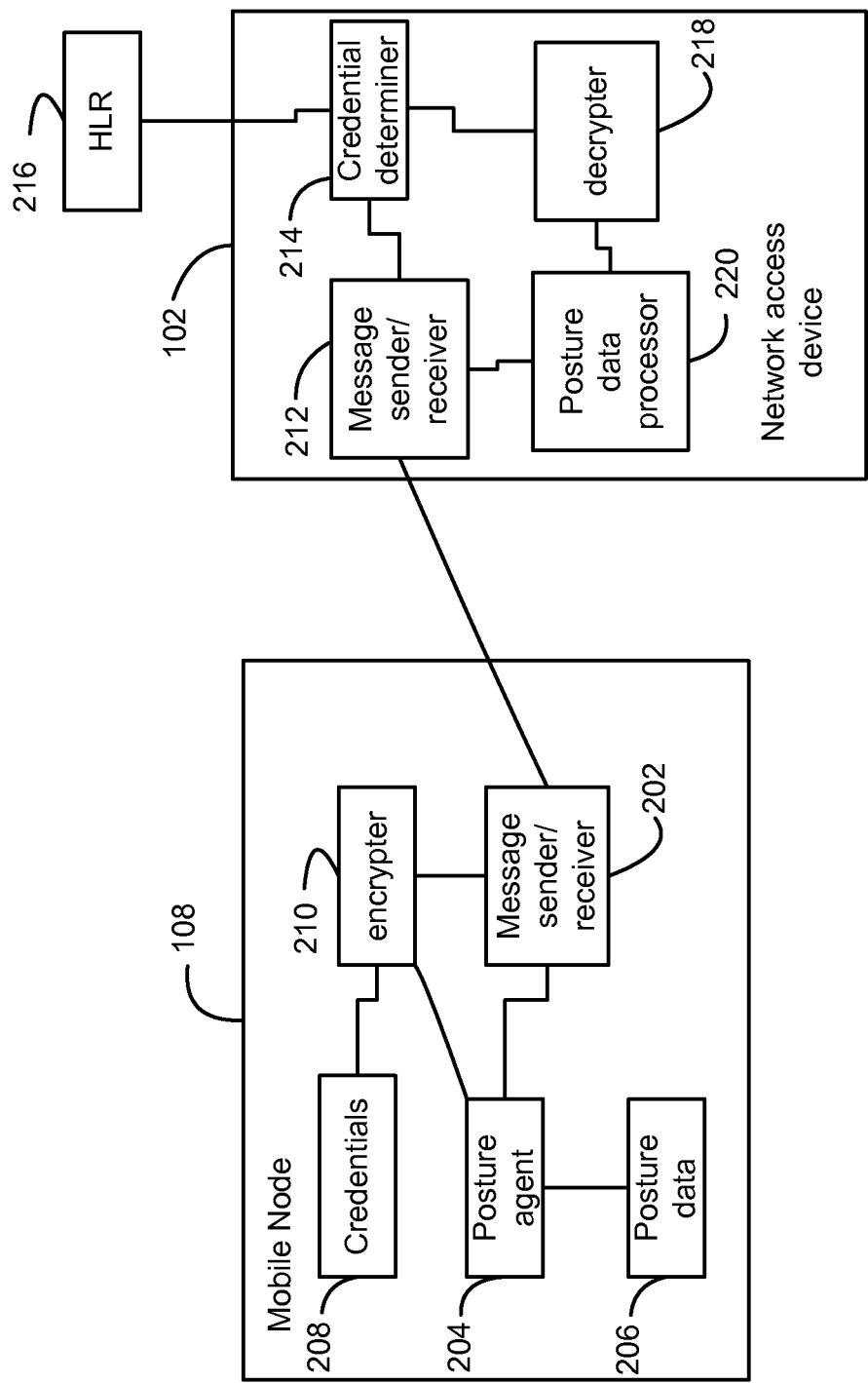
FIG. 2 depicts a more detailed example of a mobile node and a network access device.

FIG. 2 depicts a more detailed example of mobile node 108 and network access device 102. In a network admission control procedure, a message sender/receiver 202 may determine that posture data needs to be sent to network access device 102. Thus, a posture agent 204 is configured to determine posture data 206 for mobile node 108. The posture data may be defined in a type, length, value (TLV) format. The posture data is then passed to encrypter 210.

Encrypter 210 is then configured to encrypt a message that includes the posture data. For example, the encryption may be performed using credentials 208. Credentials 208 may be stored in a storage card for mobile node 108. For example, the credentials 208 may be stored in a SIM or USIM card. Encrypter 210 uses credentials 208 to determine authentication vectors that are used to encrypt and authenticate the posture data. Message sender/receiver 202 then sends the message with the encrypted posture data to network access device 102.

Message receiver/sender 212 receives the message and determines that the message is for network admission control. A credential determiner 214 is then configured to determine credentials for mobile node 108. For example, credential determiner 214 may query a home location register (HLR) for the network. HLR 216 is a central database that contains details for a subscriber for mobile node 108. HLR 216 may store details of every SIM or USIM card that is issued by a service provider. It will be understood that other storage devices may also be used in place of HLR 216, such as a home subscriber server (HSS) or a AAA server to determine credentials for mobile node 108.

Once the credentials are determined, decrypter 218 is configured to decrypt the posture data. For example, the credentials are used to generate the authentication vectors that were generated by encrypter 210. The authentication vectors are then used to decrypt and authenticate posture data.

A posture data processor 220 then processes the posture data for network admission control. For example, the posture data may include configuration information that may be used to configure the access for mobile node 108.

Message receiver/sender 212 then sends a response back to mobile node 108. The network admission control procedure may then proceed to allow access to mobile node 108.

Figure 3:
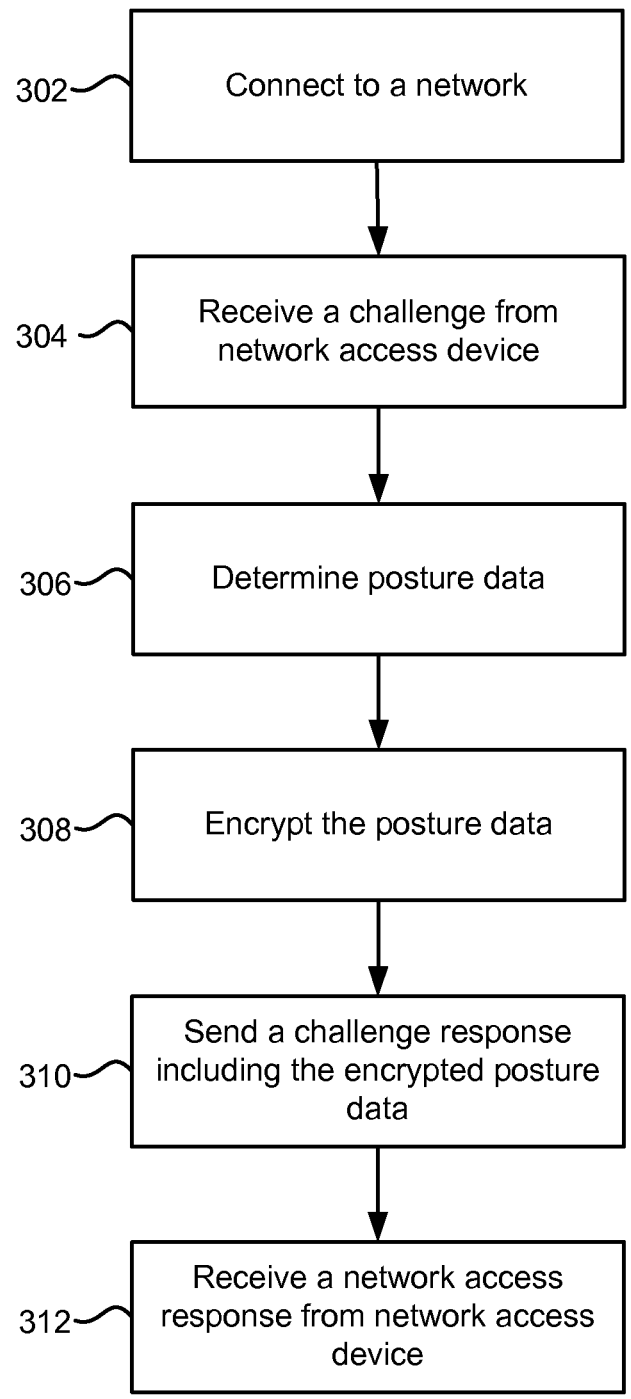
FIG. 3 depicts an example of a method for protecting posture data for network admission control at the mobile node.

FIG. 3 depicts an example of a method for protecting posture data for network admission control at mobile node 108. In step 302, mobile node 108 attempts to access network 110. For example, after attaching to radio access network 106, mobile node sends an access request for network 110. In accessing network 110, an extensible access protocol (EAP) identity exchange with network access device 102 may be performed. Mobile node 108 may receive an EAP-request/ SIM/start message containing version negotiation information. This includes the version of EAP that should be used for negotiating access. Mobile node 108 may then respond with an EAP-response/SIM/start message containing version negotiation information and a nonce, which may be a value that is only used once.

In step 304, mobile node 108 receives a challenge from network access device 102. For example, mobile node 108 receives an EAP-REQUEST/SIM/challenge message that includes a RANDS from the authentication vectors used. The authentication vectors may be determined from credentials stored in HLR 216 for mobile node 108. The challenge is a request for posture data indicating which posture data is requested from the mobile node 108. For example, an AT_ENCR attribute (the attribute in EAP that is used for including encrypted data) may include an AT_posture TLV containing the posture-TLV request, and an AT_MAC attribute, which is used to verify the authenticity and integrity of the message. Thus, network access device 102 is requesting posture data from mobile node 108.

In step 306, mobile node 108 determines posture data. For example, posture agent 204 may determine the posture data in the posture-TLV format.

In step 308, mobile node 108 encrypts and authenticates the posture data. For example, the posture data may be encrypted using credentials 208 for mobile node 108. In one example, mobile node 108 adds the encrypted AT_posture-TLV response in the AT_ENCR attribute for a challenge response. An AT_MAC attribute is also added to the challenge response for message authenticity and integrity.

At step 310, mobile node 108 sends the challenge response including the encrypted posture data. The posture data may be encrypted and stored in the AT_ENCR attribute and the challenge message may be authenticated and integrity protected using the AT_MAC attribute.

Network access device 102 may then decrypt and verify the authenticity of the posture data and determine a response to send back. For example, network access device 102 may validate the posture data.

At step 312, mobile node 108 receives a network access response from network access device 102. The response includes an AT_POSTURE_NOTIFICATION_TLV, which contains a notification as to whether the posture data was validated or not. The AT_POSTURE_NOTIFICATION_TLV may be encrypted and stored in the AT_ENCR attribute and the response message may be authenticated and integrity protected using the AT_MAC attribute. Mobile node 108 may decrypt the notification using the credentials and return an acknowledgement if everything is acceptable in the form of an EAP_REQUEST/SIM/Challenge message. An EAP_SUCCESS message is returned by network access device 102 if the process is a success.

Figure 4:
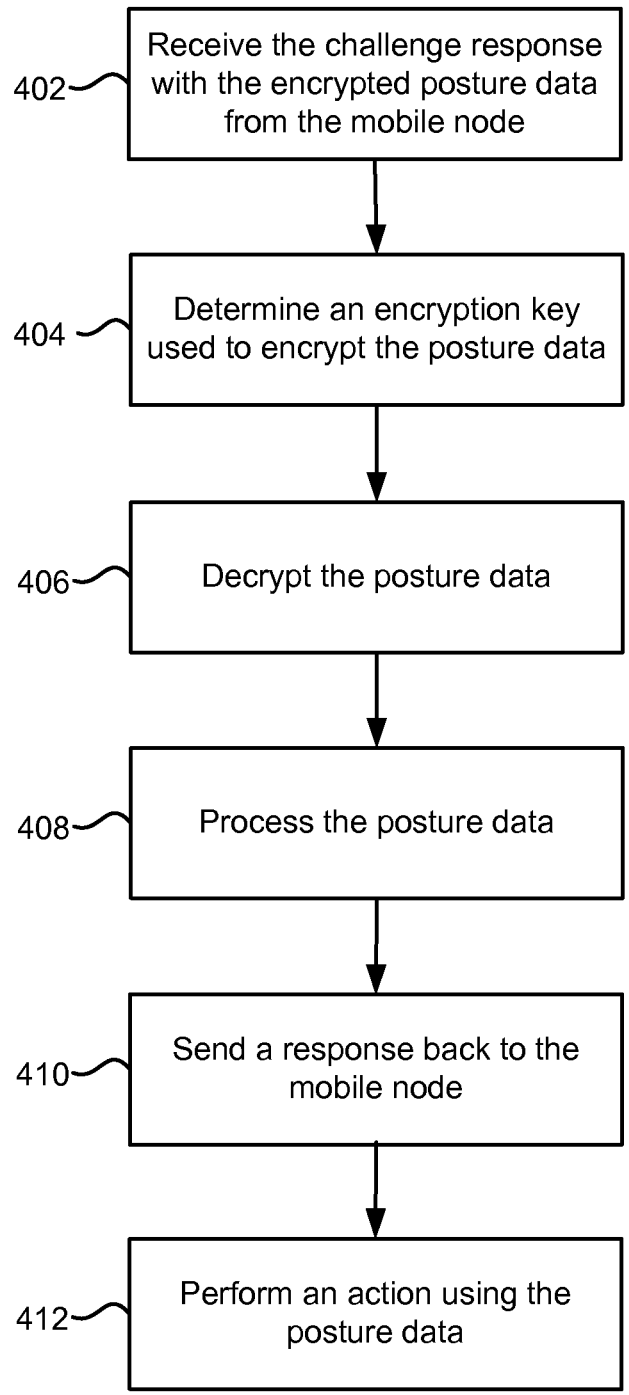
FIG. 4 depicts an example of a method for processing the posture data at the network access device.

FIG. 4 depicts an example of a method for processing the posture data at network access device 102.

In step 402, network access device 102 receives the challenge response with the encrypted posture data from mobile node 108.

In step 404, network access device 102 determines authentication vectors used to encrypt and authenticate the posture data. For example, the authentication vectors used to encrypt the posture data are determined using credentials stored in HLR 216. The authentication vectors are then generated using the credentials.

In step 406, network access device 102 decrypts the posture data. For example, the posture-TLV response in the AT_ENCR attribute may be decrypted and the message integrity and authenticity may be verified using the information in the AT_MAC attribute.

In step 408, network access device 102 processes the posture data. For example, the posture-TLV response may be validated. In step 410, network access device 102 sends a response back to mobile node 108. For example, a response is packaged in an AT_ENCR attribute within an EAP-Request SIM/Challenge message that also includes an AT_MAC attribute for message authenticity and integrity. The response also includes an AT_POSTURE_NOTIFICATION_TLV containing a posture notification TLV. The posture notification TLV indicates whether or not the posture data was validated. Mobile node 108 may then decrypt the AT_ENCR attribute and verify the AT_MAC attribute.

If the network access response is authenticated, then the Posture-Notification-TLV is then sent to posture agent 204 for processing. Mobile node 108 then can return an acknowledgement to network access device 102 in the form of an EAP-Response/SIM/Challenge with an AT_MAC attribute. Network access device 102 responds with an EAP-Success if everything is successful.

Step 412 may then perform an action using the posture data. For example, the posture data may be used in configuring access to the network. Policies may be installed that restrict access (quarantine), give access to certain services, or provide other restrictions or access to network 110.

The above process in FIGS. 3 and 4 describe an EAP network access procedure. However, a person skilled in the art will appreciate a similar procedure for EAP-AKA. Also, other mechanisms for encryption and authentication may be used in addition to different types of posture data. However, in all cases, credentials for mobile node 108 may be used in the encryption process. Also, if the posture data is too large to fit in a single message then it may be sent in pieces over several challenge-response round trips.

In sum, credentials from a storage card in mobile node 108 are used to encrypt posture data that is sent within messaging of EAP-SIM or EAP-AKA. Also, it should be noted that the credentials that may be used to encrypt posture data may be used in a process that is external to EAP. For example, the SIM or USIM credentials may be used directly within a layer 2 protocol without the EAP framework. It follows that similar techniques to the previous description could be employed to exchange encrypted and authenticated posture data. Another alternative method would be to use EAP-SIM or EAP-AKA to carry out the mobile node authentication and posture exchange within an established cryptographically protected tunnel such as in tunneled EAP methods such as PEAP/TTLS/EAP-FAST or as in TLS (Transport Layer Security).

Particular embodiments provide many advantages. For example, posture data can be encrypted without requiring additional credentials beyond those used for mobile node authentication in a cellular network. In addition, the network admission control procedure is provided with a minimum number of additional message exchanges. For example, the posture data is carried in extensions to the EAP protocol.

Although the description has been described with respect to particular embodiments thereof, these particular embodiments are merely illustrative, and not restrictive. For example, protocols other than EAP and EAP-AKA may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer readable medium can be, by way of example only but not by limitation a semiconductor system, apparatus, system, device, or computer memory.

Particular embodiments can be implemented in the form of control logic in software or hardware or a combination of both. The control logic, when executed by one or more processors, may be operable to perform that which is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving, at a network access device, a message from a mobile node for access to a network, the message including posture data encrypted by the mobile node using one or more credentials stored in the mobile node, the credentials comprising data for authenticating the mobile node to access the network;
   retrieving decryption information for the mobile node from a storage device accessible by the network access device, wherein the decryption information comprises a copy of the one or more credentials stored in the storage device;
   decrypting the posture data using the decryption information to determine the posture data, wherein the decrypting comprises:
      generating one or more authentication vectors from the decryption information, the one or more authentication vectors used by the mobile node to encrypt the posture data; and
      decrypting the posture data using the one or more authentication vectors;
      wherein the authentication vectors contain cryptographic keys used to encrypt and decrypt the posture data;
   performing a network admission control procedure in connection with the mobile node using the posture data, wherein the posture data is used during the network admission control procedure to identify software operating on the mobile node and antivirus information associated with the mobile node, and wherein a policy for access to the network is installed for the mobile node based on the posture data; and
   processing the posture data to install a policy to restrict access to the network based on the posture data.

2. The method of claim 1, further comprising sending a response message to the mobile node based on the processing of the posture data.

3. The method of claim 1, wherein determining the decryption information comprises determining the one or more credentials for the mobile node as the decryption information, the one or more credentials being stored on a network device, wherein the one or more credentials comprise at least one of a subscriber identity module ("SIM"), a Universal SIM ("USIM") and certifications.

4. The method of claim 1, wherein the network device comprises a central database that contains credentials for a plurality of mobile nodes.

5. A method comprising:
   determining posture data for access to a network by a mobile node, the posture data including configuration information for the mobile node;
   encrypting the posture data using one or more credentials stored in the mobile node, the one or more credentials comprising data used to authenticate the mobile node to access a mobile network during network admission control process, wherein the encrypting comprises:
      generating one or more authentication vectors from the credentials, the one or more authentication vectors used by the mobile node to encrypt and authenticate the posture data; and
      encrypting the posture data using the one or more authentication vectors;
      wherein the authentication vectors contain cryptographic keys used to encrypt and decrypt the posture data;

sending the encrypted posture data to a network access device for the network in a network admission control process for the mobile node, wherein the posture data is used during the network admission control process to identify software operating on the mobile node and antivirus information associated with the mobile node, and wherein a policy for access to the network is installed for the mobile node based on the posture data; and wherein the posture data is processed to install a policy to restrict access to the network based on the posture data.

6. The method of claim 5, further comprising receiving a response from the network access device based on the processing of the posture data at the network admission control procedure.

7. The method of claim 5, further comprising:
receiving a challenge message from the network access device;
determining which posture data is requested from the challenge message; and
performing the determining, encrypting, and sending elements.

8. The method of claim 5, wherein the one or more credentials comprise information in a storage object for the mobile node, the storage object used to identify the mobile node to the mobile communication network.

9. An apparatus comprising:
one or more processors;
a memory element; and
logic encoded in a non-transitory computer-readable medium for execution by the one or more processors and when executed operable to:
receive, at a network access device, a message from a mobile node for access to a network, the message including posture data encrypted by the mobile node using one or more credentials stored in the mobile node, the credentials comprising data for authenticating the mobile node to access the network;
retrieve decryption information for the mobile node from a storage device accessible by the network access device, wherein the decryption information comprises a copy of the one or more credentials stored in the storage device;
decrypt the posture data using the decryption information to determine the posture data, wherein the decrypting comprises:
generating one or more authentication vectors from the decryption information, the one or more authentication vectors used by the mobile node to encrypt the posture data; and
decrypting the posture data using the one or more authentication vectors;
wherein the authentication vectors contain cryptographic keys used to encrypt and decrypt the posture data;
perform a network admission control procedure in connection with the mobile node using the posture data, wherein the posture data is used during the network admission control procedure to identify software operating on the mobile node and antivirus information associated with the mobile node, and wherein a policy for access to the network is installed for the mobile node based on the posture data; and
wherein the posture data is processed to install a policy to restrict access to the network based on the posture data.

10. The apparatus of claim 9, wherein the logic when executed is further operable to send a response message to the mobile node based on the processing of the posture data.

11. The apparatus of claim 9, wherein the logic when executed is further operable to determine the one or more credentials for the mobile node as the decryption information, the one or more credentials being stored on a network device, wherein the one or more credentials comprise at least one of a subscriber identity module ("SIM"), a Universal SIM ("USIM") and certifications.

12. The apparatus of claim 11, wherein the network device comprises a central database that contains credentials for a plurality of mobile nodes.

13. An apparatus comprising:
one or more processors;
a memory element; and
logic encoded in a non-transitory computer-readable medium for execution by the one or more processors and when executed operable to:
determine posture data for access to a network by a mobile node, the posture data including configuration information for the mobile node;
encrypt the posture data using one or more credentials stored in the mobile node, the one or more credentials comprising data used to authenticate the mobile node to access a mobile network during network admission control process, wherein the encrypting comprises:
generating one or more authentication vectors from the credentials, the one or more authentication vectors used by the mobile node to encrypt and authenticate the posture data; and
encrypting the posture data using the one or more authentication vectors;
wherein the authentication vectors contain cryptographic keys used to encrypt and decrypt the posture data;
send the encrypted posture data to a network access device for the network in a network admission control process for the mobile node, wherein the posture data is used during the network admission control process to identify software operating on the mobile node and antivirus information associated with the mobile node, and wherein a policy for access to the network is installed for the mobile node based on the posture data; and
wherein the posture data is processed to install a policy to restrict access to the network based on the posture data.

14. The apparatus of claim 13, wherein the logic when executed is further operable to receive a response from the network device based on the processing of the posture data at the network admission control procedure.

15. The apparatus of claim 13, wherein the logic when executed is further operable to:
receive a challenge message from the network access device;
determine that posture data is requested from the challenge message; and
perform the determining, encrypting, and sending elements.

16. The apparatus of claim 13, wherein the one or more credentials comprise information in a storage object for the mobile node, the storage object used to identify the mobile node to the mobile communication network.

* * * * *